(12) United States Patent
Poulain et al.

(10) Patent No.: US 9,049,270 B2
(45) Date of Patent: Jun. 2, 2015

(54) DEVICE FOR SELECTING DIGITAL SERVICE STREAMS, AND METHOD, COMPUTER PROGRAM AND STORAGE MEANS CORRESPONDING THERETO

(75) Inventors: Ludovic Poulain, Cesson Sevigne (FR); Laurent Roul, Cesson Sevigne (FR)

(73) Assignee: ENENSYS TECHNOLOGIES, Cesson Sevigne (FR)

( * ) Notice: Subject to any disclaimer, the term of this patent is extended or adjusted under 35 U.S.C. 154(b) by 0 days.

(21) Appl. No.: 13/992,276

(22) PCT Filed: Dec. 6, 2011

(86) PCT No.: PCT/EP2011/071838
§ 371 (c)(1),
(2), (4) Date: Aug. 26, 2013

(87) PCT Pub. No.: WO2012/076490
PCT Pub. Date: Jun. 14, 2012

(65) Prior Publication Data
US 2013/0322557 A1   Dec. 5, 2013

(30) Foreign Application Priority Data
Dec. 8, 2010 (FR) .................................. 10 60266

(51) Int. Cl.
*H04L 29/06* (2006.01)
*H04H 20/10* (2008.01)
(Continued)

(52) U.S. Cl.
CPC ............ *H04L 65/60* (2013.01); *H04H 20/103* (2013.01); *H04N 21/2389* (2013.01);
(Continued)

(58) Field of Classification Search
CPC .......... H04N 21/2389; H04N 21/2404; H04N 21/242; H04N 21/4385; H04N 21/631; H04L 65/60; H04L 65/4075; H04H 20/103
USPC .......................... 375/219, 220, 222, 259, 295
See application file for complete search history.

(56) References Cited

U.S. PATENT DOCUMENTS

| 6,765,865 | B1 | 7/2004 | Rayner et al. |
| 2003/0142670 | A1 | 7/2003 | Gould et al. |

(Continued)

FOREIGN PATENT DOCUMENTS

| FR | 2936919 A1 | 4/2010 |
| WO | 2009112371 A1 | 9/2009 |

OTHER PUBLICATIONS

Digital Video Broadcasting (DVB); Modulator Interface (T2-MI) for a second generation digital terrestrial television broadcasting system (DVB-T2); Technical Specification, European Telecommunications Standards Institute (ETSI), 650, Route Des Lucioles; F-06921 Sophia-Antipolis; France; vol. Broadcas, No. vol. 1.2.1; Dec. 1, 2010; XP014061858.

*Primary Examiner* — Leon Flores
(74) *Attorney, Agent, or Firm* — Bachman & LaPointe, P.C.

(57) ABSTRACT

A device is positioned upstream of a modulator in a digital service stream broadcasting chain, and is adapted to receive a plurality of transport streams and to transmit a transport stream to a modulator, each transport stream encapsulating a digital service stream adapted to be broadcast by the modulator, the digital service streams representing the same digital service. The device is also adapted to: digital service streams from the received transport streams; detect errors in the streams; align the extracted streams; select a stream from the aligned streams, according to any errors detected; encapsulate the selected stream, in order to form the stream to be transmitted to the modulator.

10 Claims, 5 Drawing Sheets

(51) Int. Cl.
*H04N 21/2389* (2011.01)
*H04N 21/24* (2011.01)
*H04N 21/242* (2011.01)
*H04N 21/4385* (2011.01)
*H04N 21/63* (2011.01)
*H04H 20/67* (2008.01)

(52) U.S. Cl.
CPC ........ *H04N 21/2404* (2013.01); *H04N 21/242* (2013.01); *H04N 21/4385* (2013.01); *H04N 21/631* (2013.01); *H04L 65/4076* (2013.01); *H04H 20/67* (2013.01)

(56) References Cited

U.S. PATENT DOCUMENTS

2007/0237185 A1   10/2007  Pereira et al.
2011/0179340 A1*  7/2011   Poulain ........................ 714/799

\* cited by examiner

DEVICE FOR SELECTING DIGITAL SERVICE STREAMS, AND METHOD, COMPUTER PROGRAM AND STORAGE MEANS CORRESPONDING THERETO

BACKGROUND

The present invention relates to the field of broadcasting digital services to terminals retrieving these services. More particularly, the present invention is concerned with the problem of the reliability of the broadcasting chain.

Networks broadcasting digital services are becoming widespread. Mention may be made for example of the terrestrial digital video broadcasting standard DVB-T ("Digital Video Broadcasting—Terrestrial"): "*ETSI EN 300 744 V1.5.1, Digital Video Broadcasting (DVB): Framing Structure, Channel Coding and Modulation for Digital Terrestrial Television*", and the digital video broadcasting standard for mobile terminals DVB-H ("*Digital Video Broadcasting—Handheld*): "*ETSI EN 302 304, DVB-H—Transmission System for Handheld Terminals*".

In such broadcasting networks, the services are individually encoded by a set of encoders. Each of these encoders has contents forming the service for which it is responsible. Such contents can comprise video sequences, audio sequences, texts or even interactive applications. On output of each encoder, each service is available in the form of a digital data stream comprising a set of packets. These services are then multiplexed by a multiplexer. This operation consists of constructing a stream that mixes the data packets of the various services before being broadcast. This results in a digital data stream comprising the data of the different services. Use may be made of the transport stream format MPEG-2 TS (Moving Picture Experts Group-2 Transport Stream) described in the document "*ISO/CEI 13818-1, Generic Coding of Moving Pictures and Associated Audio Information: Systems*" or the format according to the Internet Protocol IP.

In the context of a microwave radio transmission, the stream is intended to be sent in the form of a radio signal by one or more modulators. To do this, the stream has to be shaped by a formatting module. This formatting may, for example, consist of inserting synchronization labels in the stream, in such a way as to allow the modulator or modulators to synchronize the transmission of the radio signal in the context of a distribution of the SFN ("Single Frequency Network") type.

The patent document WO 2009/112371 A1 describes a broadcasting system having a duplicated formatting module. This broadcasting system allows a modulator to switch between the two streams generated by the two formatting modules without becoming desynchronized. These formatting modules are synchronized with each other in order to generate synchronized streams. A modulator can thus switch from a first stream generated by one of the formatting modules to a second stream generated by the other formatting module, without need for resynchronizing the modulator. In this way, an incident occurring in the generation of the stream does not automatically result in a service interruption.

However, the broadcasting system described in this document WO 2009/112371 A1 is not suitable for an implementation in the context of a broadcasting based upon the second-generation digital terrestrial video broadcasting standard DVB-T2: "*EN 302 755 V1.1.1, Frame Structure, Channel Coding and Modulation for a Second Generation Digital Terrestrial Television Broadcasting System*". Indeed, the synchronization performed between MPEG2 TS transport streams does not prevent from resynchronization at the level of the modulator in this context.

The same problem occurs in the context of other digital service broadcasting chains, if they show redundancy through the use of a plurality of digital service streams representing the same digital service, these streams being encapsulated in respective transport streams.

It is desirable to overcome these various drawbacks of the prior art.

SUMMARY OF THE INVENTION

The invention relates to a device intended to be positioned upstream of a modulator in a digital service stream broadcasting chain, said device comprising means for receiving a plurality of transport streams and means for transmitting a transport stream to the modulator, each transport stream encapsulating a digital service stream adapted to be broadcast by said modulator, said digital service streams representing the same digital service, the device being such that it comprises: extracting means for extracting digital service streams from the received transport streams; detecting means for detecting errors at the level of the received transport streams and/or at the level of the extracted digital service streams; aligning means for aligning extracted digital service streams; selecting means for selecting a stream from amongst the aligned digital service streams, according to possible errors detected by said detecting means, and encapsulating means for encapsulating the selected digital service stream, in order to form said transport stream to be transmitted to said modulator. Thus, a resynchronizing at the level of the modulator is prevented when occurs interference causing errors during the transport of the data of the digital service to be broadcast.

According to a particular embodiment, said aligning means comprise storing means for storing the packets of the extracted digital service streams in correspondence with respective packet-type information and respective values of a counter of continuity of said packets within their respective digital service streams. Aligning the digital service streams is thus facilitated.

According to a particular embodiment, said aligning means comprise reading means for reading a stored packet and, said means being implemented to read a packet of a given digital service stream, said means are additionally activated to read a packet of another digital service stream if the respective packet-type information thereof and the respective continuity counter values thereof coincide. Aligning the streams is thus performed in a simple manner by co-ordinated reading of buffers.

According to a particular embodiment, said storing means are adapted to store the packets of the extracted digital service streams in correspondence with pieces of information representing moments at which said packets are respectively stored, and said reading means are further activated in accordance with said pieces of information. The encapsulating step performed by the device to obtain a transport stream intended for the modulator is driven by the timing of the selected digital service stream.

According to a particular embodiment, said reading means are initially activated following the expiry of a timer of predefined duration started upon storing the first packet of said stream. A constant processing time is thus applied by the device.

According to a particular embodiment, said selecting means take into consideration a priority order predefined amongst said aligned digital service streams. Reliability of the service transmission is thus reinforced, for example in establishing this priority order in accordance with an a priori degree of robustness of the transmissions of the transport streams up to said device.

The invention also relates to a digital service stream broadcasting system, said system being intended to transmit to a modulator a transport stream encapsulating a digital service stream adapted to be broadcast by said modulator, the system being such that it comprises a device as specified above, referred to as a stream selecting device, and at least one supplying device supplying said plurality of transport streams to said stream selecting device.

According to a particular embodiment, the system comprises a plurality of supplying devices, and said supplying devices comprise: means for assigning a master status to a given supplying device, a slave status being assigned to every other supplying device; respective generating means for generating digital service streams, said generating means of each slave device being timewise driven by those of the master device.

The invention also relates to a method performed by a device intended to be positioned upstream of a modulator in a digital service stream broadcasting chain, said device comprising receiving means for receiving a plurality of transport streams and transmitting means for transmitting a transport stream to the modulator, each transport stream encapsulating a digital service stream adapted to be broadcast by said modulator, said digital service streams representing the same digital service, the method being such that it comprises the steps of: extracting a digital service stream from the transport streams received by said device; detecting an error at the level of the received transport streams and/or at the level of the extracted digital service streams; aligning the extracted digital service streams; selecting a stream from amongst the aligned digital service streams, in accordance with any errors detected by said detecting means; encapsulating the selected digital service stream, in order to form said transport stream to be transmitted to said modulator.

The invention likewise relates to a computer program which can be stored on a medium and/or downloaded from a communications network, in order to be read by a computer system or a processor. This computer program comprises instructions for implementing the above-mentioned method, when said program is executed by a computer system or a processor. The invention likewise relates to storage means comprising a computer program of this type.

BRIEF DESCRIPTION OF THE DRAWINGS

The above-mentioned features of the invention as well as others will become clearer from a reading of the following description of an example embodiment, said description being made with reference to the accompanying drawings, in which FIG. 1 schematically illustrates a digital service broadcasting system in which the present invention can be implemented.

DETAILED DESCRIPTION

Figure 1:
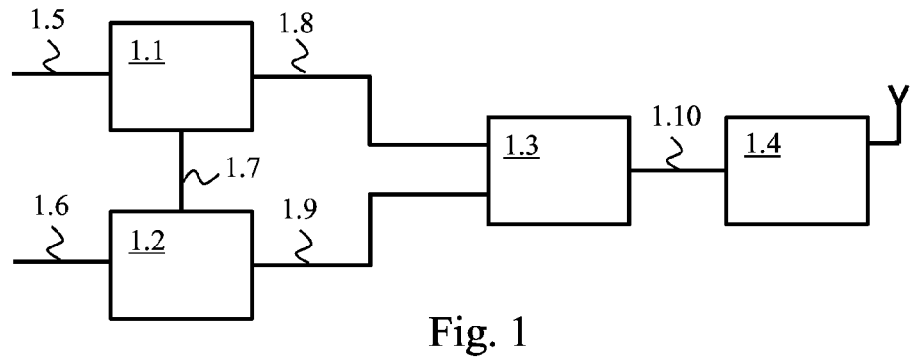

In order to enable the broadcasting of a digital system to be maintained, redundancy is introduced into the digital service broadcasting chain upstream of the modulator. In this way, a plurality of streams representing the digital service are going to follow different transmission paths and are going to bring diversity at the modulator input, in order to allow—in the event of errors on one of these streams—switching to one other of these streams. These streams may be generated by the same supplying device, such as a gateway in the scope of the standard DVB-T2, or by a plurality of supplying devices, such as a plurality of gateways in parallel in the scope of the standard DVB-T2. These streams are thus generated such that to have the same envelope shape, i.e. with T2MI frames of identical shape and size in the scope of the standard DVB-T2, but possibly with contents offset in time. These streams are then encapsulated in respective MPEG2 TS transport streams.

It is proposed that a device should be positioned upstream of the modulator in the digital service stream broadcasting chain. This device comprises receiving means for receiving a plurality of transport streams, each encapsulating a digital service stream as mentioned above. In accordance with the standard DVB-T2, these digital service streams are T2MI streams. The device performs extracting a digital service stream from the received transport streams and detects possible errors in the received transport streams, i.e. at the MPEG2 TS level in the scope of the standard DVB-T2, and/or in the extracted digital service stream, i.e. at T2MI level (T2 Modulator Interface) in the scope of the standard DVB-T2. The device then aligns extracted digital service streams and selects a stream from amongst the aligned streams, in accordance with any detected errors. Finally, the device encapsulates the selected stream in order to form the transport stream to be transmitted up to the modulator. When the device subsequently detects errors in the selected stream, it selects another stream from the aligned streams. In other words, it switches to this other stream.

The following description seeks to describe an implementation of the present invention in the context of a digital service broadcasting chain in accordance with the standard DVB-T2. Other broadcasting chains can be used without departing from the scope of the present invention, if they have a redundancy through the use of a plurality of digital service streams representing the same digital service, these streams being encapsulated in respective transport streams. In addition, the following description seeks to describe an implementation of the present invention in the context of a digital service broadcasting chain having two devices supplying these digital service streams representing the same digital service and encapsulated in respective transport streams. As already mentioned, a single supplying device can be used without departing from the scope of the present invention. Such supplying devices are referred to as gateways in the context of a digital service broadcasting chain in accordance with the standard DVB-T2.

FIG. 1 schematically illustrates a digital service broadcasting system in which the present invention can be implemented. The broadcasting system shown in FIG. 1 conforms to the standard DVB-T2.

Digital services are received in the form of at least one MPEG2 TS transport stream, referred to as TS stream or TS packets below, by gateways 1.1 and 1.2 via respective links 1.5 and 1.6. The broadcasting system may comprise a larger number of gateways in order to increase reliability of the broadcasting chain.

In accordance with the standard DVB-T2, each gateway 1.1 and 1.2 forms baseband (BB) frames from each received TS stream. The quantity of useful data in the BB frames depends upon the transmission parameters: constellation, code rate, error correction data of the FEC type (Forward Error Correction), etc. The gateways 1.1 and 1.2 then encapsulate the BB frames in T2MI packets. In addition, the gateways 1.1 and 1.2 generate T2MI signalling packets and T2MI packets containing timestamp information. Several types of T2MI packets are thus generated by the gateways 1.1 and 1.2. More precisely, the T2MI packets are grouped by frames of the T2 type, the period of one T2 frame being defined by the used OFDM ("Orthogonal Frequency Division Multiplexing") modulation parameters. Each T2 frame comprises T2MI packets containing BB frames, then a T2MI timestamp information packet and then a T2MI signalling packet. The T2MI signalling packet contains information of the type L1, i.e. it contains modulation information: bandwidth, FFT ("Fast Fourier Transform") size, etc.

The information contained in the T2MI timestamp information packet corresponds to an indication of the moment at which the T2 superframe, comprising a pre-defined number of successive T2 frames, has to be sent by each modulator in the case of a distribution of the SFN type. The timestamp information may be absolute when using a common reference starting point or relative, for example with respect to a timing of the PPS ("Pulse Per Second") type. This timestamp information is not significant in the case of a distribution of the MFN ("Multiple Frequency Network") type. However, all the modulators and gateways of the broadcasting network shall have a common clock, in view of the fact that the standard DVB-T2 does not allow a rate adaptation at the level of the modulators.

The gateways 1.1 and 1.2 encapsulate the T2MI packets in TS packets in order to allow transporting the digital services up to modulators 1.4 (only one of which is illustrated in FIG. 1). PAT ("Program Association Table") and PMT ("Program Map Table") tables and optionally stuffing packets, also referred to as NULL packets, are added in order to obtain a TS stream at a constant rate and valid from the standpoint of the report ETR 290: *"Digital Video Broadcasting (DVB); Measurement Guidelines for DVB Systems"* and more particularly of the paragraph *"Measurement and Analysis of the MPEG-2 Transport Stream"* of this report. The gateways 1.1 and 1.2 thus perform a rate adaptation at the level of the TS stream.

The gateways 1.1 and 1.2 transmit the T2MI packets, encapsulated in the TS packets, respectively via the links 1.8 and 1.9. The links 1.8 and 1.9 may be different in nature, for example the link 1.8 corresponds to a satellite communication and the link 1.9 corresponds to a communication via the Internet. A data stream selecting module 1.3 receives these T2MI packets, encapsulated in TS packets, via these links 1.8 and 1.9. This module 1.3 is responsible for dynamically selecting a stream from amongst those emerging from the gateways 1.1 and 1.2 and for supplying it to the modulator 1.4 via a link 1.10.

When the stream emerging from one of the gateways 1.1 and 1.2 is interrupted, for example following a transmission error, the module 1.3 selects the stream emerging from the other gateway. In this way, a stream switching can take place when the stream which was selected so far has undergone an interruption. A synchronization at the level of the T2 superframe is then necessary, which means that the T2 superframes and the T2 frames are sent at the same moment and that the values of the continuity counters for the T2MI packets sent simultaneously by the gateways are identical; if not, the change from one stream to another would imply a resulting stream which is not correct from the point of view of the standard DVB-T2, the size of a T2 frame would not be correct with respect to information of the L1 type and a discontinuity would occur with regard to counter values contained in the T2MI packets. Indeed, the T2MI packets belonging to a same T2 superframe have to contain the same counter value. Thus, when switching from one stream to the other, it would be necessary for the modulator 1.4 to be resynchronized, which means that the digital service would be suspended for the duration of resynchronization, which might be several seconds.

In view of the fact that each gateway 1.1 and 1.2 performs a rate adaptation at the level of the TS packets which is not deterministic, the data stream selecting module 1.3 has to ensure the synchronization of the streams in order to enable that switching from one stream to the other be performed transparently. In order to do this, it performs an alignment of the streams, an example embodiment of which is described hereafter with respect to FIGS. 5a, 5b and 5c.

The gateways 1.1 and 1.2 are synchronized at the level of T2 frame or T2 superframe. The gateways 1.1 and 1.2 thus generate the T2 superframes, and therefore the T2 frames, at the same moments. The T2MI timestamp information packets sent at the same moment by the gateways 1.1 and 1.2 thus comprise the same timestamp information. This synchronization of the gateways 1.1 and 1.2 is obtained by negotiation via a link 1.7, with negligible latency with respect to the T2 frame periods, linking these gateways. The gateways 1.1 and 1.2 exchange messages in order to determine the gateway to which the master status is allocated, the other gateway then having the slave status allocated thereto. The slave gateway is then timewise driven by the master gateway, the master gateway sending to the slave gateway, at each T2 superframe, the timestamp information of the current T2 superframe as well as the continuity counter value of the T2MI packets of this T2 superframe.

At the beginning of the negotiation, the gateways are considered to be slaves, and one gateway has to be chosen as the master. Each gateway thus sends a status enquiry message to the other. Upon receiving a status enquiry, the gateway 1.1 or 1.2 returns its status, the latter comprising an indication of the state of reception of the signals of a reference clock and of the state of reception of the input stream. If a gateway has one of its input signals—stream or reference clock—which is not received correctly, it automatically takes the slave status. The other thus takes the master status. If each of the gateways 1.1 and 1.2 correctly receives its input signals, a master gateway is for example selected by identifier comparison, such as their MAC ("Medium Access Control) addresses.

Once the master gateway no longer correctly receives one of its input signals—stream or reference clock—, it takes the slave status and informs the other gateway of such, which then takes the master status, provided that these input signals are correct. In the event that neither of the gateways 1.1 and 1.2 correctly receives its input signals, neither gateway is able to take the master status. This rare situation of simultaneous errors at the gateways 1.1 and 1.2 results in an interruption of the broadcasting of the digital service.

For each T2 superframe to be transmitted, each of the gateways 1.1 and 1.2 determines the associated timestamp information. The master gateway thus transmits to the slave gateway a synchronization message comprising the timestamp information that it has determined, as well as the value of the continuity counter for the T2MI packets of this T2 superframe. The slave gateway checks whether the timestamp information supplied by the master gateway coincides with the one that it has determined itself. It is possible to allow a certain desynchronization tolerance, for example of 1 µs. If the timestamp information differs, the slave gateway is resynchronized at the next T2 superframe. The timestamp information of the next T2 superframe generated by the slave gateway is then the one received by the master gateway to which the theoretical duration of one T2 superframe is added. The slave gateway may furthermore verify that the value of the continuity counter for the T2MI packets is identical to the one supplied by the master gateway. In the event of a difference, the continuity counter for the T2MI packets takes the value received by the master gateway, to which is added the number of T2MI packets theoretically generated during a T2 superframe.

Figure 2:
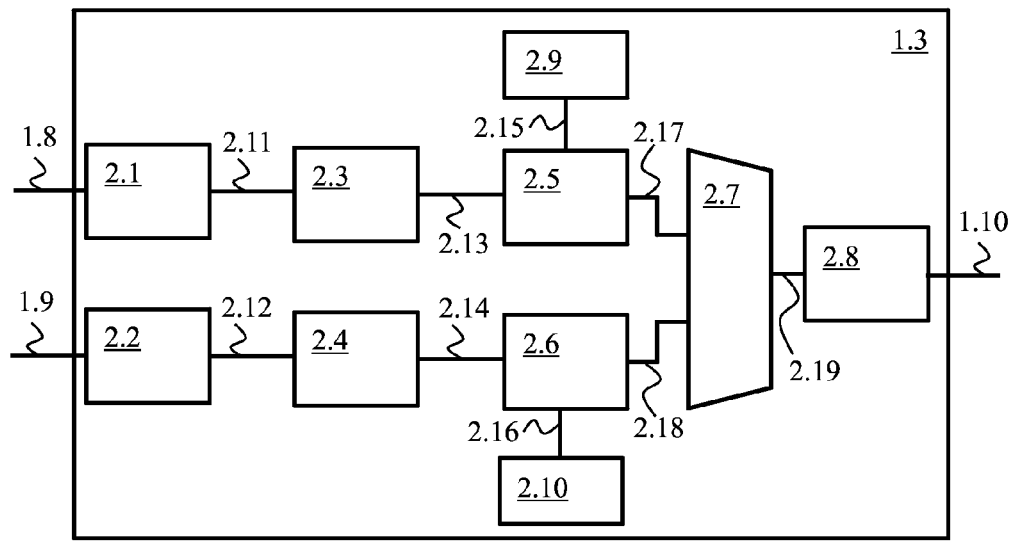
FIG. 2 schematically illustrates a first embodiment of a data stream selection module of the broadcasting system as shown in FIG. 1.
Figure 3:
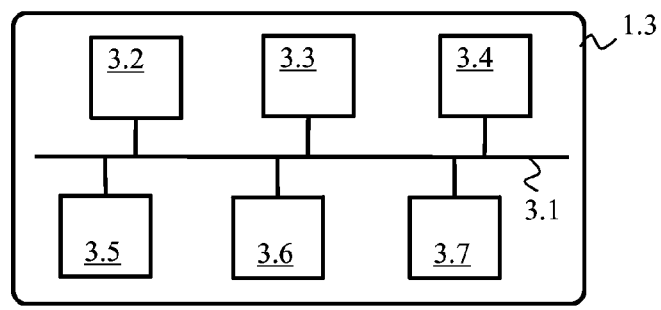
FIG. 3 schematically illustrates a second embodiment of the data stream selection module of the broadcasting system as shown in FIG. 1.

FIGS. 2 and 3 schematically illustrate a first and a second embodiment respectively of the data stream selecting module 1.3.

FIG. 2 corresponds to an implementation of the data stream selecting module 1.3 in hardware form. The module 1.3 can thus for example take the form of a machine or a dedicated component, such as an FPGA ("Field-Programmable Gate Array) or an ASIC ("Application-Specific Integrated Circuit").

The module 1.3 comprises modules 2.1 and 2.2 for analysing conformity at the TS level, with respect to the recommendations of the report ETR 290, of the streams received via the links 1.8 and 1.9 respectively. The errors that can be detected by the modules 2.1 and 2.2 include errors of loss of synchronization of the TS stream, PAT table errors, errors in the continuity counter value, etc. If such errors are detected, they are fed back to a stream switching decision module 2.7. In a particular embodiment, the module 1.3 can be configured in such a way as to mask errors of conformity at the TS level of one or more types, in such a way that they do not cause stream switching.

The module 1.3 further comprises modules 2.3 and 2.4 for analysing conformity at the T2MI level. These modules respectively receive, via the links 2.11 and 2.12, from the modules 2.1 and 2.2, the data streams received via the links 1.8 and 1.9, as well as an indication of possible conformity errors at the TS level. The modules 2.3 and 2.4 extract the T2MI packets from the received TS streams and then analyse the conformity of the data at the T2MI level. The errors which can be detected by the modules 2.3 and 2.4 include T2MI counter value continuity errors, parity values by CRC ("Cyclic Redundancy Check") field analysis, T2MI packet length errors, etc. If such errors are detected, they are fed back to the stream switching decision module 2.7. In a particular embodiment, the module 1.3 can be configured in such a way as to mask errors of conformity at the TS level of one or more given types, in such a way that they do not cause stream switching.

The module 1.3 further comprises buffers 2.5 and 2.6 of the FIFO type ("First-In First-Out"). The T2MI packets are stored in the buffers 2.5 and 2.6 by the modules 2.3 and 2.4 via links 2.13 and 2.14 respectively. Each T2MI packet is stored jointly with the continuity counter value associated with it, with an indication relating to the type of T2MI packet, as well as any errors detected by the modules 2.1 and 2.2 for analysing conformity at the TS level and by the modules 2.3 and 2.4 for analysing conformity at the T2MI level. Each T2MI packet is furthermore jointly stored with a piece of information representing the moment at which it is stored in the buffer 2.5 or 2.6 in question. These pieces of information representing the moments at which the T2MI packets are stored in the buffers 2.5 and 2.6 are obtained from the respective timestamp modules 2.9 and 2.10 via links 2.15 and 2.16. The stream switching decision module 2.7 can access the packets, and all the information stored in the buffers 2.5 and 2.6 via respective links 2.17 and 2.18.

The stream switching decision module 2.7 performs an alignment of the streams of the stored T2MI packets, and in accordance with the result of this alignment and with any errors detected by the modules 2.1, 2.2, 2.3 and 2.4, it selects T2MI packets to be transmitted to the modulator 1.4. An embodiment of stream alignment performed by the module 2.7 is described hereafter with respect to FIGS. 5a, 5b and 5c.

The module 1.3 further comprises a TS encapsulation module 2.8. The module 2.8 generates a TS stream from the T2MI packets selected by the module 2.7 in order to allow transporting the digital service up to the modulator 1.4. PAT and PMT tables, and optionally stuffing packets, or NULL packets, are added in order to obtain a TS stream at a constant rate and valid with respect to the report ETR 290, the rate of this stream being driven by the stream selected by the module 2.7.

FIG. 3 corresponds to an implementation in software form of the data stream selecting module 1.3, by execution of a set of instructions by a programmable machine, such as a DSP ("Digital Signal Processor") or a microcontroller. In accordance with this implementation, the module 1.3 comprises, linked by a communication bus 3.1: a processor, microprocessor, microcontroller or CPU ("Central Processing Unit") 3.2; a RAM ("Random Access Memory") 3.3; a ROM ("Read Only Memory") 3.4; a storage-medium reader 3.5, such as an SD ("Secure Digital") card reader; means 3.6 for interfacing with the links 1.8 and 1.9; and means 3.7 for interfacing with the link 1.10.

The microcontroller 3.2 is capable of executing instructions loaded in the RAM 3.3 from the ROM 3.4, from a storage medium, such as an SD card or the like, or from a communications network (not shown). When the module 1.3 is powered on, the microcontroller 3.2 is capable of reading instructions from the RAM 3.3 and executing them. These instructions form a computer program causing the implementation, by the microcontroller 3.2, of all or some of the algorithms described hereafter with reference to FIGS. 4, 5a, 5b and 5c.

Figure 4:
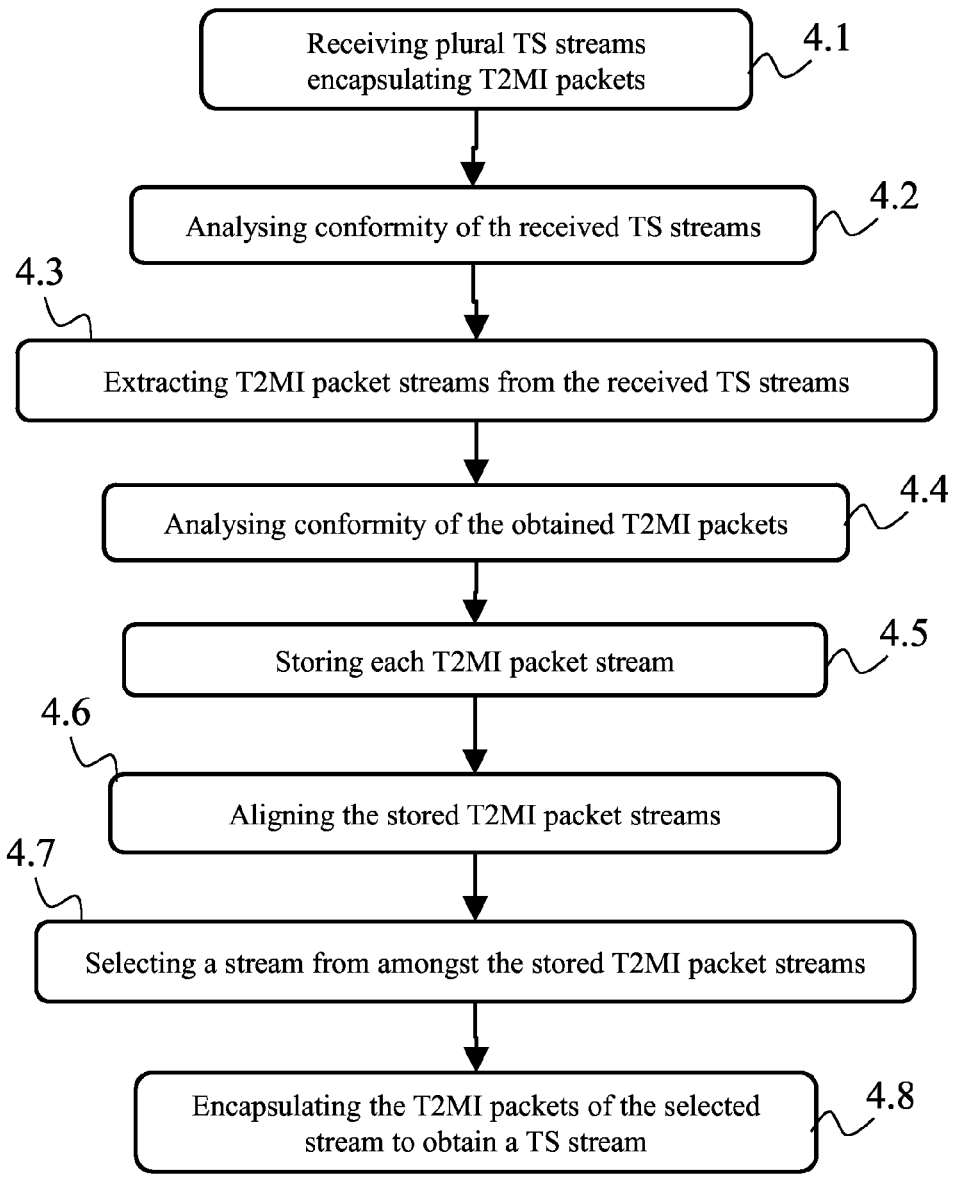
FIG. 4 schematically illustrates a first algorithm used by the data stream selection module of the broadcasting system as shown in FIG. 1, FIGS. 5a, 5b and 5c schematically illustrate a second algorithm used by the data stream selection module of the broadcasting system as shown in FIG. 1, according to an embodiment of the present invention.

FIG. 4 schematically illustrates an algorithm implemented by the data stream selecting module 1.3.

In a step 4.1, the module 1.3 receives a plurality of TS streams, each encapsulating T2MI packets. In a following step 4.2, the module 1.3 performs a conformity analysis of the received TS streams, as already described with respect to FIG. 3. In a following step 4.3, the module 1.3 extracts T2MI packet streams from the received TS streams. In a following step 4.4, the module 1.3 performs a conformity analysis of the extracted T2MI streams, as already described with respect to FIG. 3. In a following step 4.5, the module 1.3 stores each T2MI packet stream in a buffer. Each T2MI packet is stored jointly with the continuity counter value associated with it, with an indication concerning the type of T2MI packet, as well as any errors detected in the steps 4.2 and 4.4. In addition, each T2MI packet is jointly stored with a piece of information representing the moment at which it is stored in the buffer in question.

In a following step 4.6, the module 1.3 performs an alignment of streams of stored T2MI packets, and in a following step 4.7, selects a stream from amongst the streams of stored T2MI packets in accordance with the result of the performed alignment and of any errors detected in the steps 4.2 and 4.4. An embodiment of these operations is described in greater detail hereafter with respect to FIGS. 5*a*, 5*b* and 5*c*.

In a following step 4.8, the module 1.3 performs an encapsulation of the T2MI packets of the stream selected in the step 4.7 in order to obtain a TS stream. This TS stream is then transmitted to the modulator 1.4.

In the step 4.7, the module 1.3 selects a T2MI packet stream, the data of which are not maned by errors, whether they be errors at the TS level or at the T2MI level. If the stream selected so far becomes maned by errors, the module 1.3 switches to another stream, aligned, and which is not marred by errors. Since the streams are aligned at the T2MI level, switching does not affect the behaviour of the modulator 1.4, which has thus no need to be resynchronized.

Figure 5A:
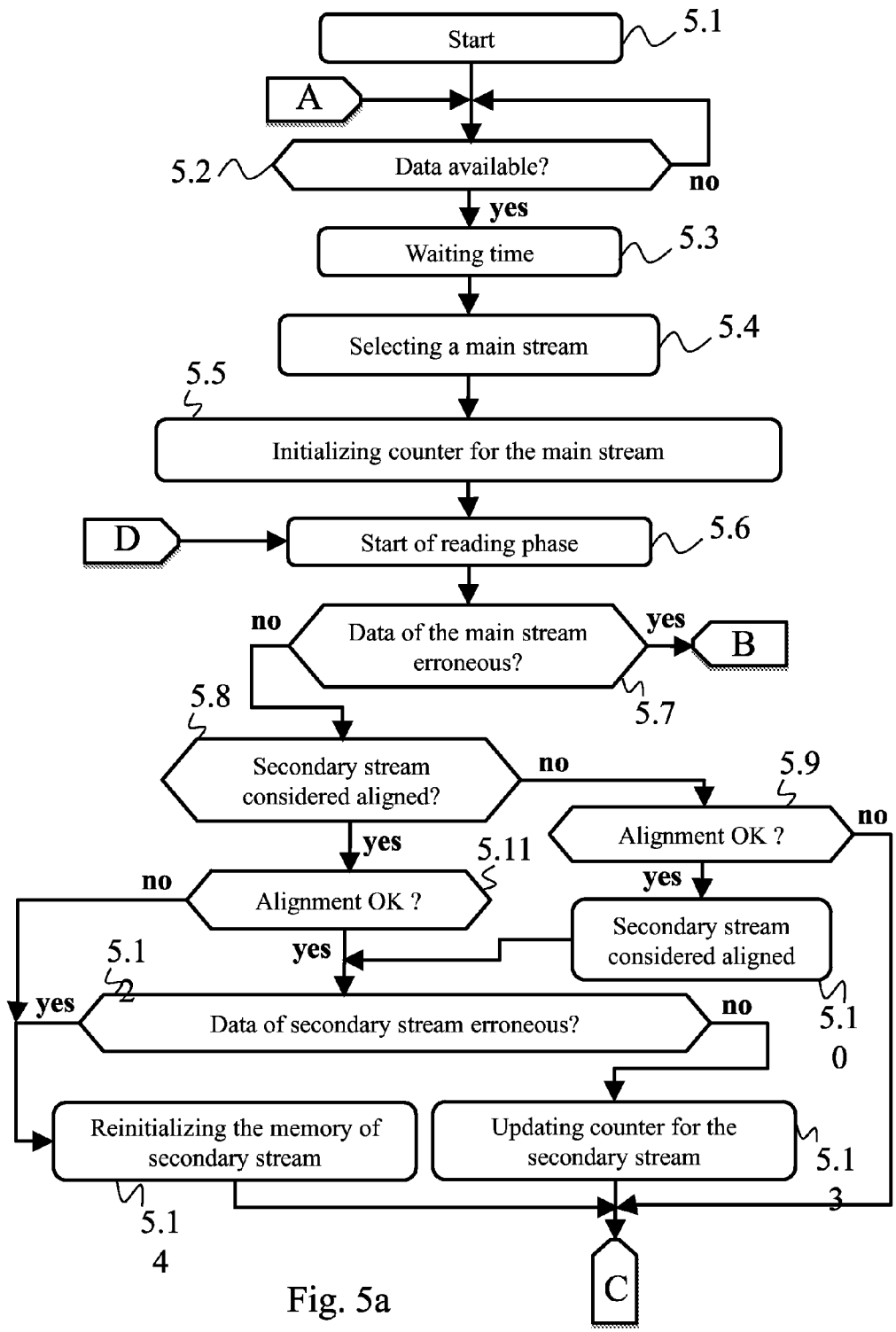
Figure 5B:
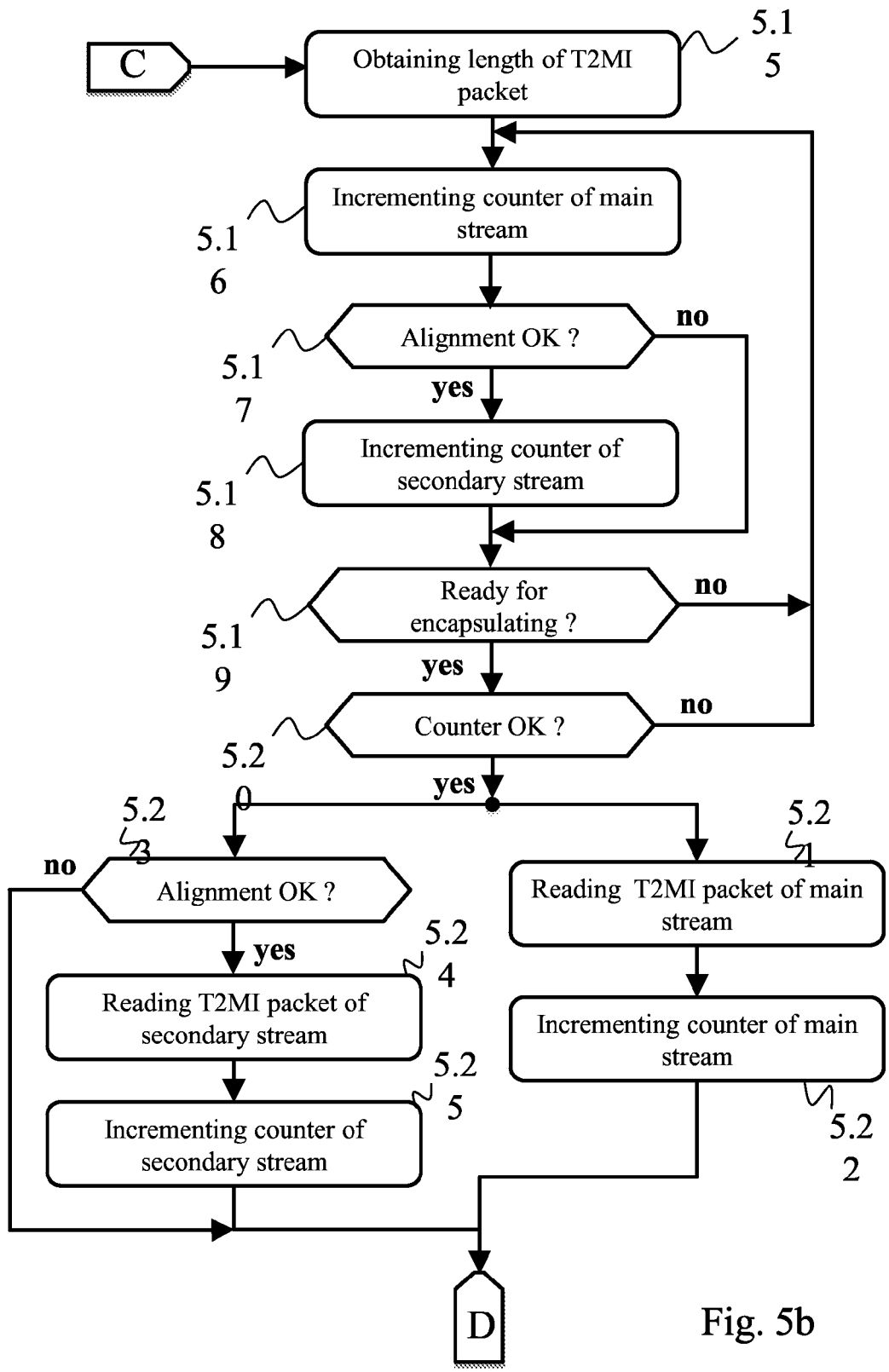
Figure 5C:
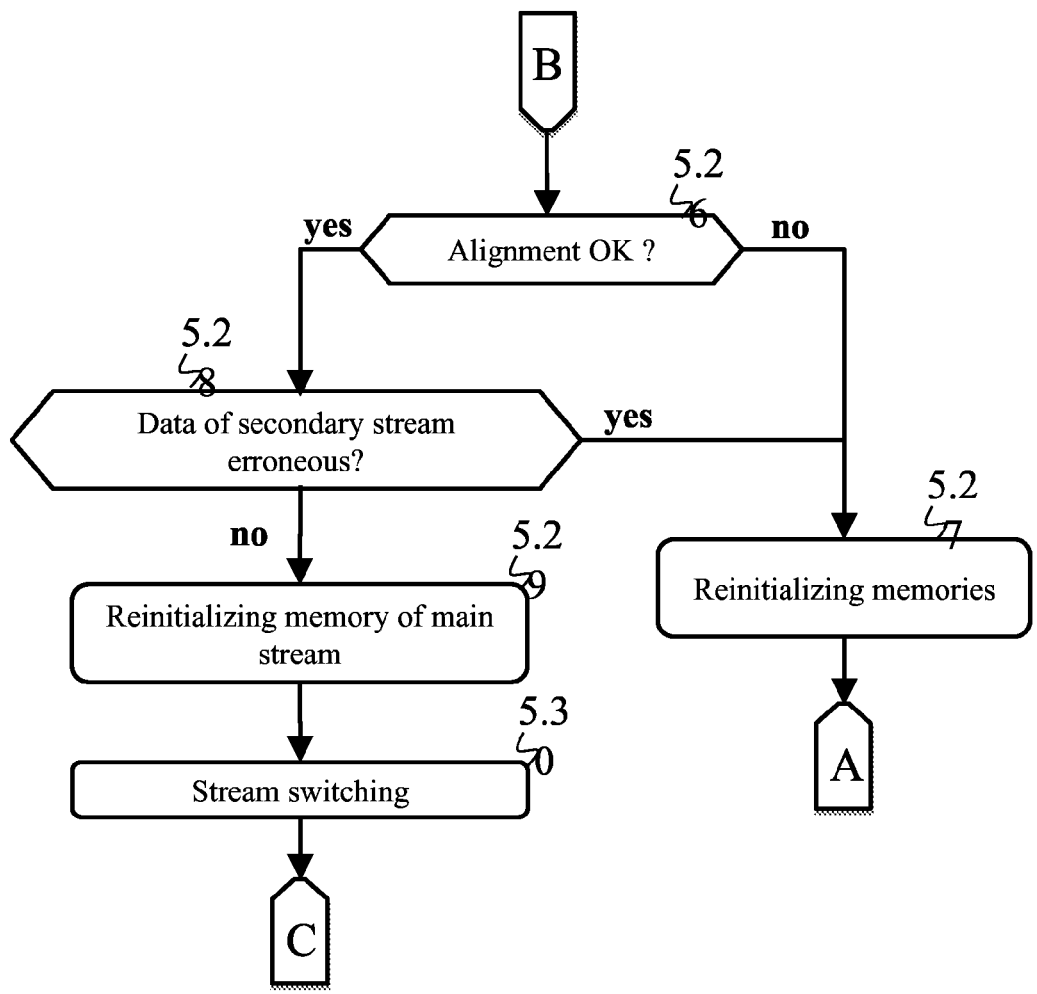

FIGS. 5*a*, 5*b* and 5*c* schematically illustrate an algorithm implemented by the module 1.3 and intended to enable it to determine, from the streams of stored T2MI packet, which are suitable for being transmitted to the modulator 1.4, and intended to enable it to align the streams of stored T2MI packet and to select the T2MI packets to be encapsulated in order to transmit them to the modulator 1.4. This algorithm is, in the context of the embodiment described in relation to FIG. 2, more particularly implemented by the module 2.7.

The algorithm of FIGS. 5*a*, 5*b* and 5*c* is presented in detail for managing two T2MI packet streams, but its principle can be extended to more streams.

The algorithm starts, in a step 5.1, with an initialization phase. In a following step 5.2, the module 1.3 determines whether data are available in the buffers in which the T2MI packets are intended to be stored. If that is the case, a step 5.3 is performed, otherwise the step 5.2 is repeated. When one of the buffers containing the T2MI packets starts to be filled, the module 1.3 triggers a timer. This timer has a predefined duration sufficient to compensate for any jitter on each of the TS streams received in the step 4.1 and to compensate for any possible transmission time offset between the links 1.8 and 1.9. In the step 5.3, the module 1.3 awaits the expiry of the time delay corresponding to this timer. Once the timer has elapsed, in a step 5.4, the module 1.3 selects a T2MI packet stream stored in the step 4.5 as the main stream, i.e. which a priori is intended to be encapsulated for transmission to the modulator 1.4. The other stream is then selected as a secondary stream. In a following step 5.5, the module 1.3 initializes a counter, associated with the main stream, with a value corresponding to the moment at which the first T2MI packet of the main stream was stored in the concerned buffer.

In a following step 5.6, the module 1.3 terminates the initialization phase and starts a T2MI packet reading phase. In a following step 5.7, the module 1.3 determines whether the main stream is marred by errors, whether at the TS level or at the T2MI level. If this is the case, the module 1.3 considers that the main stream is not suitable to be transmitted to the modulator 1.4 and a step 5.26 is performed (connection of the flowchart to the label B in FIG. 5*c*); otherwise a step 5.8 is performed.

In the step 5.8, the module 1.3 determines whether the secondary stream is considered to be aligned. It should be pointed out that, inasmuch as a step 5.10 described below is not performed, the secondary stream is not considered to be aligned. If this is the case, a step 5.11 is performed; otherwise a step 5.9 is performed.

In the step 5.9, the module 1.3 determines whether the conditions for the secondary stream to be considered as being aligned with the main stream are met, i.e. whether the next T2MI packet to be read for the secondary stream is of the same type and contains the same continuity counter value as the next T2MI packet for the main stream. If that is the case, a step 5.10 is performed, in which the module 1.3 considers that the secondary stream is aligned, and a step 5.12 is performed; otherwise a step 5.15 is performed (connection of the flowchart to the label C in FIG. 5*b*).

In the step 5.11, the module 1.3 checks whether the conditions for the secondary stream to be considered as being aligned with the main stream are still met. If that is the case, the step 5.12 is performed; otherwise a step 5.14 is performed.

In the step 5.12, the module 1.3 determines whether the secondary stream is maned by errors, whether they be at the TS level or at the T2MI level. If that is the case, the module 1.3 considers that the secondary stream is not suitable to be transmitted to the modulator 1.4 and the step 5.14 is performed; otherwise a step 5.13 is performed.

In the step 5.13, the module 1.3 updates a counter associated with the secondary stream by giving it a value corresponding to the moment at which the next T2MI packet of the secondary stream has been stored in the concerned buffer.

After that, the step 5.15 is performed (connection of the flowchart to the label C in FIG. 5*b*).

In the step 5.14 the buffer intended for the T2MI packets of the secondary stream is reinitialized, whether because the secondary stream is no longer in alignment or because it contains—or the TS stream encapsulating it contains—erroneous data. After that, the step 5.15 is performed (connection of the flowchart to the label C in FIG. 5*b*).

In the step 5.15, the module 1.3 obtains the length of the T2MI packet to be read. This value is common to all of the streams suitable for being transmitted to the modulator 1.4, since these are in alignment. In a following step 5.16, the counter associated with the main stream is incremented. This counter is incremented on the basis of the rate of the clock which has served as a reference to determine the moments at which the T2MI packets are buffered. It is considered in the algorithm of FIGS. 5*a*, 5*b* and 5*c* that the steps between the steps 5.6 and 5.15 are performed in one pulse of this clock.

In a following step 5.17, the module 1.3 determines whether the secondary stream is considered to be aligned. If this is the case, a step 5.18 is performed; otherwise a step 5.19 is performed. In step 5.18, the counter associated with the secondary stream is incremented, in the same way as the one associated with the main stream in the step 5.16. In the following step 5.19, implemented in the context of the embodiment described with respect to FIG. 2, the module 1.3 determines whether the TS encapsulation module 2.8 is ready to receive data. If this is the case, a step 5.20 is performed; otherwise the step 5.16 is performed once again.

In a step 5.20, the module 1.3 determines whether the counter associated with the main stream has reached, or gone beyond, a value corresponding to the moment at which the next T2MI packet to be read for the main stream has been buffered. If this is the case, steps 5.21 and 5.23 are performed; otherwise the step 5.16 is performed once again.

In the following step 5.23, the module 1.3 determines whether the secondary stream is considered to be aligned. If this is the case, a step 5.24 is performed; otherwise the step 5.6 is repeated (connection of the flowchart to the label D in FIG. 5*a*).

In step 5.24, the T2MI packet of the secondary stream is read at the same rate as the T2MI packet of the main stream in the step 5.21, but is not encapsulated or transmitted for encapsulation. In other words, this packet is deleted. In a following step 5.25, the counter associated with the secondary stream is incremented, in the same way as in the step 5.18. After that, the step 5.6 is repeated (connection of the flowchart to the label D in FIG. 5*a*).

In the step 5.21, the T2MI packet of the main stream is read, and is encapsulated or transmitted for encapsulation. It is thus selected for encapsulation for the purpose of transmission to the modulator 1.4. In a following step 5.22, the counter associated with the main stream is incremented, in the same way as in the step 5.16. After that, the step 5.6 is repeated (connection of the flowchart to the label D in FIG. 5*a*), and a new phase of reading T2MI packets is implemented. As a result of the steps 5.21 and 5.24, the reading of a T2MI packet is then activated in order to read a packet of a T2MI stream other than the main stream, i.e. the one currently selected, if they are in alignment.

In this way, by virtue of the counters respectively associated with the main stream and the secondary stream, as well as the delay applied in the step 5.3, a fixed processing time is applied by the module 1.3 to the TS streams. In addition, the TS stream generated by the module 1.3 is driven by the selected T2MI packet stream.

In the step 5.26, the module 1.3 determines whether the secondary stream is considered to be aligned with the main stream, i.e. whether the step 5.10 has been performed beforehand. If this is the case, a step 5.28 is performed; otherwise a step 5.27 is performed. In the step 5.28, the module 1.3 determines whether the secondary stream is marred by errors, whether at the TS level or at the T2MI level. If this is the case, the module 1.3 considers that the secondary stream is not suitable to be transmitted to the modulator 1.4 and the step 5.27 is performed; otherwise a step 5.29 is performed. In the step 5.27, since the main stream and the secondary stream are marred by errors, the buffers in which the T2MI packets are stored are reinitialized, and the step 5.2 is repeated (connection of the flowchart to the label A in FIG. 5*a*). A new initialization phase is then implemented.

In the step 5.29, since the main stream is maned by errors, the buffer in which its T2MI packets are stored is reinitialized, and in a following step 5.30, a stream switching is performed. The secondary stream then becomes the main stream and the main stream becomes the secondary stream. After that, the step 5.15 is performed (connection of the flowchart to the label C in FIG. 5*b*).

In a variant embodiment, the T2MI streams are ranked in a priority order, for example in a manner dependent upon a respective level of robustness of their transmission to the module 1.3. From amongst the streams which are aligned and not maned by errors, the stream of the highest priority is selected in the step 4.7. This allows increasing the reliability of the transmission to the modulator 1.4, by limiting the risk that the selected stream contains errors, which are visible on reception of the service but which do not cause streams switching within the module 1.3.

The invention claimed is:

1. A device intended to be positioned upstream of a modulator in a digital service stream broadcasting chain, said device comprising:
   receiving means for receiving a plurality of transport streams, each said transport stream encapsulating a digital service stream adapted to be broadcast by said modulator, said digital service streams representing the same digital service:
   extracting means for extracting digital service streams respectively encapsulated in the received transport streams;
   detecting means for detecting errors at one of a level of the received transport streams and a level of the extracted digital service streams;
   aligning means for aligning the extracted digital service streams;
   selecting means for selecting a stream from the aligned digital service streams, according to any errors detected by said detecting means;
   encapsulating means for encapsulating the selected digital service stream, in order to form a resulting transport stream to be transmitted to said modulator; and
   transmitting means for transmitting the resulting transport stream to the modulator.

2. The device according to claim 1, wherein said aligning means comprise storing means for storing packets of the extracted digital service streams in correspondence with respective packet-type information and with respective values of a counter of continuity of said packets within the respective digital service streams.

3. The device according to claim 2, wherein said storing means are adapted to store the packets of the extracted digital service streams in correspondence with information representing moments at which said packets are stored respectively, that said reading means are, in addition, activated in accordance with said information representing moments.

4. The device according to claim 1, wherein said aligning means comprise reading means for reading a stored packet, and said reading means being used to read a packet of a given digital service stream, said reading means are further activated to read a packet of another digital service stream if the respective packet-type information thereof and the respective continuity counter values thereof coincide.

5. The device according to claim 4, wherein said reading means are initially activated following expiry of a timer of pre-defined duration started when storing the first packet of said stream.

6. The device according to claim 1, wherein said selecting means take into consideration a predefined priority order amongst said aligned digital service streams.

7. A digital service stream broadcasting system being intended to transmit to a modulator a transport stream encapsulating a digital service stream adapted to be broadcast by said modulator, said device according to claim 1, said device being a stream selecting device, and at least one supplying means for supplying said plurality of transport streams to said stream selecting device.

8. A system according to claim 7, wherein said system comprises a plurality of supplying devices, and each said supplying device comprising means for assigning a master status to a given supplying device, a slave status being assigned to every other supply device; and respective generating means for generating digital service streams, said generating means of each slave device being timewise driven by those of the master device.

9. A method performed by a device intended to be positioned upstream of a modulator in a digital service stream broadcasting chain, said method comprising:
   receiving a plurality of transport streams, each transport stream encapsulating a digital service stream adapted to be broadcast by said modulator, said digital service streams representing the same digital service:
   extracting a digital service stream respectively encapsulated in the received transport streams;
   detecting an error at one of a level of the received transport streams and a level of the extracted digital service streams;
   aligning the extracted digital service streams;
   selecting a stream from amongst the aligned digital service streams, in accordance with any errors detected;
   encapsulating the selected digital service stream in order to form a resulting transport stream to be transmitted to said modulator; and transmitting the resulting transport stream to the modulator.

10. A non-transitory storage medium storing a computer program comprising instructions for performing, by a device intended to be positioned upstream of a modulator in a digital service stream broadcasting chain, the method according to claim 9, when said program is executed by a processor of said device.

\* \* \* \* \*